US010598095B2

(12) United States Patent
Kemp et al.

(10) Patent No.: US 10,598,095 B2
(45) Date of Patent: Mar. 24, 2020

(54) INTEGRATED STARTER FOR AERIAL VEHICLE

(71) Applicant: Unison Industries, LLC, Jacksonville, FL (US)

(72) Inventors: Brian Christopher Kemp, Troy, OH (US); Theodore Scott Puterbaugh, Xenia, OH (US)

(73) Assignee: Unison Industries, LLC, Jacksonville, FL (US)

( * ) Notice: Subject to any disclaimer, the term of this patent is extended or adjusted under 35 U.S.C. 154(b) by 395 days.

(21) Appl. No.: 15/290,475

(22) Filed: Oct. 11, 2016

(65) Prior Publication Data
US 2018/0100438 A1    Apr. 12, 2018

(51) Int. Cl.
*F02C 7/277* (2006.01)
*B64D 31/02* (2006.01)
*B64D 27/10* (2006.01)
*F02N 7/12* (2006.01)

(52) U.S. Cl.
CPC .............. *F02C 7/277* (2013.01); *B64D 27/10* (2013.01); *B64D 31/02* (2013.01); *F02N 7/12* (2013.01); *F02N 2300/104* (2013.01); *F05D 2260/96* (2013.01); *F05D 2270/052* (2013.01); *F05D 2270/301* (2013.01); *F05D 2270/303* (2013.01); *F05D 2270/807* (2013.01)

(58) Field of Classification Search
CPC . F02C 7/04; F02C 7/057; F02C 7/277; B64D 27/10; B64D 27/02; F02N 7/00; F02N 7/10; F02N 7/12
See application file for complete search history.

(56) References Cited

U.S. PATENT DOCUMENTS

| 3,310,937 A | 3/1967 | Smith |
| 4,702,273 A | 10/1987 | Allen, Jr. et al. |
| 5,107,674 A | 4/1992 | Wibbelsman et al. |

(Continued)

FOREIGN PATENT DOCUMENTS

| CN | 201925074 U | 8/2011 |
| EP | 2 434 130 A2 | 3/2012 |

(Continued)

OTHER PUBLICATIONS

Extended European Search Report and Opinion issued in connection with corresponding EP Application No. 17195647.7 dated Feb. 27, 2018.

(Continued)

*Primary Examiner* — Craig Kim
(74) *Attorney, Agent, or Firm* — Dority & Manning, P.A.

(57) ABSTRACT

Systems and methods for starting an engine on an aircraft are provided. One example aspect of the present disclosure is directed to an integrated starter for starting an engine on an aircraft. The integrated starter includes an air turbine starter. The integrated starter includes a starter air valve integrated with the air turbine starter. The integrated starter includes a controller configured to control the starter air valve. The starter air valve can be movable between a first position and at least a second position to regulate the flow of fluid into the air turbine starter. An output torque of the air turbine starter can be dependent at least in part on the flow of fluid into the air turbine starter.

20 Claims, 6 Drawing Sheets

(56) References Cited

U.S. PATENT DOCUMENTS

| | | | |
|---|---|---|---|
| 5,463,865 A | 11/1995 | Smith | |
| 6,019,310 A | 2/2000 | Maino et al. | |
| 6,470,258 B1 | 10/2002 | Leamy et al. | |
| 6,694,746 B2 | 2/2004 | Reed et al. | |
| 7,066,710 B2 | 6/2006 | Wiggins et al. | |
| 7,147,430 B2 | 12/2006 | Wiggins et al. | |
| 8,838,359 B2 | 9/2014 | Qiu et al. | |
| 8,991,242 B2 | 3/2015 | Benitah | |
| 2012/0067062 A1* | 3/2012 | Veilleux, Jr. | F02C 7/277 60/788 |
| 2012/0118103 A1* | 5/2012 | Blewett | F02C 7/277 74/7 C |
| 2012/0266606 A1 | 10/2012 | Zeiner et al. | |
| 2013/0340442 A1 | 12/2013 | Djebali | |
| 2014/0373552 A1 | 12/2014 | Zaccaria et al. | |
| 2014/0373553 A1 | 12/2014 | Zaccaria et al. | |
| 2014/0373554 A1 | 12/2014 | Pech et al. | |
| 2015/0082805 A1 | 3/2015 | Zeiner et al. | |
| 2015/0377141 A1 | 12/2015 | Foiret | |
| 2017/0234233 A1 | 8/2017 | Schwarz et al. | |
| 2018/0023479 A1 | 1/2018 | Clauson et al. | |

FOREIGN PATENT DOCUMENTS

| | | |
|---|---|---|
| EP | 3 075 966 A1 | 10/2016 |
| EP | 3 205 858 A1 | 8/2017 |
| EP | 3273007 A1 | 1/2018 |
| JP | 4294758 B2 | 7/2009 |
| JP | 2010/104189 A | 5/2010 |
| JP | 5722315 B2 | 5/2015 |
| WO | 2015/156761 A1 | 10/2015 |

OTHER PUBLICATIONS

Kemp, B.C., et al., Starter controller, GE co-pending U.S. Appl. No. 15/290,527, filed Oct. 11, 2016.

Kemp, B.C., et al., Starter issue detection, GE co-pending U.S. Appl. No. 15/290,508, filed Oct. 11, 2016.

European Office Action Corresponding to Application No. 17195647.7 dated Apr. 10, 2019.

Chinese Office Action Corresponding to Application No. 201710940885.7 dated Oct. 28, 2019.

* cited by examiner

INTEGRATED STARTER FOR AERIAL VEHICLE

FIELD OF THE INVENTION

The present subject matter relates generally to aerial vehicles.

BACKGROUND OF THE INVENTION

An aerial vehicle can use an air turbine starter to start an engine. A starter air valve can be used to provide fluid to the air turbine starter. The air turbine starter can include an air turbine motor, a speed reducer, and an over-running clutch. The air turbine motor converts energy from the fluid supplied by the starter air valve to high speed rotation energy. The speed reducer converts the high speed, low torque input to low speed, high torque output usable by the engine. The over-running clutch allows for the de-coupling of the air turbine motor and speed reducer from the engine during normal engine operation. The starter air valve operates independently of the air turbine starter. In some cases, the starter air valve can provide excessive fluid to the air turbine starter, which can cause unnecessary wear and tear on an engine accessory gearbox.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to an integrated starter for starting an engine on an aircraft. The integrated starter includes an air turbine starter. The integrated starter includes a starter air valve integrated with the air turbine starter. The integrated starter includes a controller configured to control the starter air valve. The starter air valve can be movable between a first position and at least a second position to regulate the flow of fluid into the air turbine starter. An output torque of the air turbine starter can be dependent at least in part on the flow of fluid into the air turbine starter.

Other example aspects of the present disclosure are directed to systems, methods, aircrafts, avionics systems, devices, non-transitory computer-readable media for starting an engine of an aerial vehicle. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
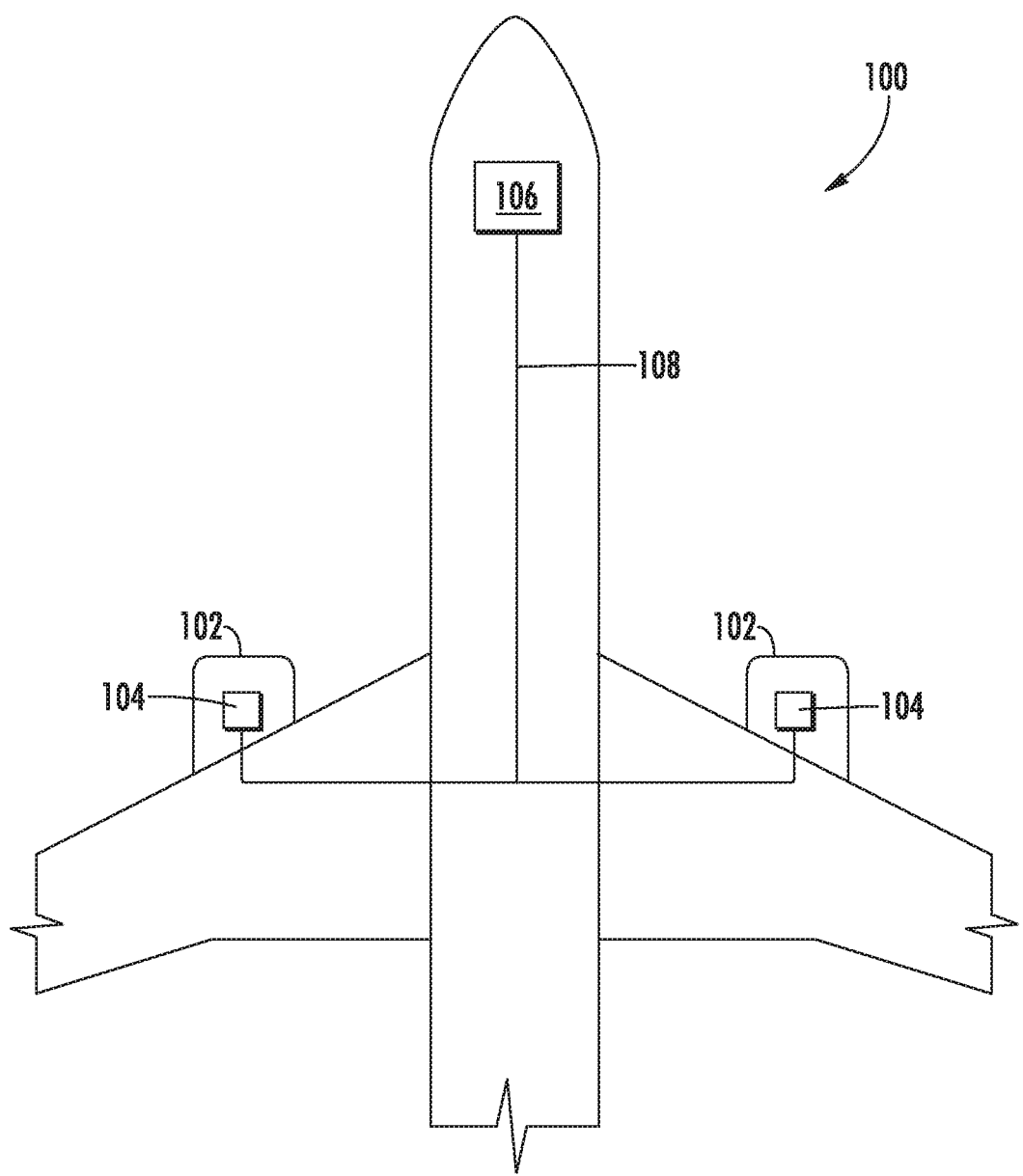
FIG. 1 depicts an example aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems associated with an integrated starter for an air turbine vehicle. For instance, the starter air valve and the air turbine starter can be located within a common housing. In addition and/or in the alternative, the starter air valve can be mechanically coupled to the air turbine starter. The integrated starter can start an engine of an aerial vehicle. A starter air valve can provide fluid (e.g., motive air, gases, other fluids, etc.) to the air turbine starter. The air turbine starter can convert the fluid provided to torque energy usable by the engine.

In some embodiments, the integrated starter can include an integrated controller. For instance, the controller can be located within a common housing with the starter air valve and/or the air turbine starter. In addition and/or in the alternative, the controller can be mechanically coupled to the starter air valve and/or the air turbine starter. The controller can be configured to provide control signals to components of the integrated starter. In some embodiments, the controller can be an open-loop controller and does not receive feedback. In some embodiments, the controller can control the opening and closing of the starter air valve. For instance, as one example, the controller can control the rate of opening of the starter air valve. As another example, the controller can control the open percentage of the starter air valve. The higher percentage the controller is open, the more fluid can be provided to the air turbine starter.

Optionally, in some embodiments, the starter air valve can include one or more valve sensors. The one or more valve sensors can include a pressure gauge, a vacuum gauge, a manometer, the like, and/or any combination of the foregoing. The one or more valve sensors can measure pressure and/or temperature associated with the air turbine starter.

The starter air valve can modify the rate of opening (or closing) and/or the open percentage in response to the measured pressure and/or temperature. For example, if the measured pressure and/or temperature indicate that the torque output should increase, then the starter air valve can modify the rate of opening and/or the open percentage to increase the fluid provided to the air turbine starter.

Optionally, in some embodiments, the air turbine starter can include one or more starter sensors. For example, the one or more starter sensors can be included on a stationary portion of the air turbine starter to monitor a rotating portion of the air turbine starter. The one or more starter sensors can provide signals indicative of a frequency associated with the air turbine starter. The one or more starter sensors can provide signals indicative of a magnitude associated with the air turbine starter. For instance, in some embodiments, the one or more starter sensors can include an accelerometer, a microphone, the like, and/or any combination of the foregoing. The one or more starter sensors can measure mechanical vibration and/or sound. The one or more starter sensors can transmit signals indicative of the measured mechanical vibration and/or sound to one or more computing devices and/or a controller. The one or more computing devices and/or the controller can determine an irregular movement of the rotating portion of the air turbine starter based at least in part on the one or more signals. The one or more computing devices and/or the controller can create a notification to indicate a problem with the integrated starter, engine, and/or accessory gearbox in response to the determined irregular movement of the rotating portion of the air turbine starter.

FIG. 1 depicts an aerial vehicle 100 according to example embodiments of the present disclosure. The aerial vehicle 100 can include one or more engines 102. In some implementations, at least one of the one or more engines 102 can be configured as one or more gas turbine engines. For example, the one or more engines 102 can include a compressor section, a combustion section, and a turbine section in serial flow order. One or more of the one or more engines 102 can be configured as a turbofan engine, a turbojet engine, a turboprop engine, a turboshaft engine, etc. In other implementations, one or more of the one or more engines 102 can be an internal combustion engine, or any other suitable engine for use in an aircraft. The one or more engines 102 can include and/or be coupled to one or more integrated starters 104, as described in more detail below. The one or more integrated starters 104 can communicate with a controller 106 via a communication path 108. The controller 106 can be, for example, a full authority digital engine control (FADEC). The communication path 108 can be, for example, a communication bus, such as an aircraft communication bus.

The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

Figure 2:
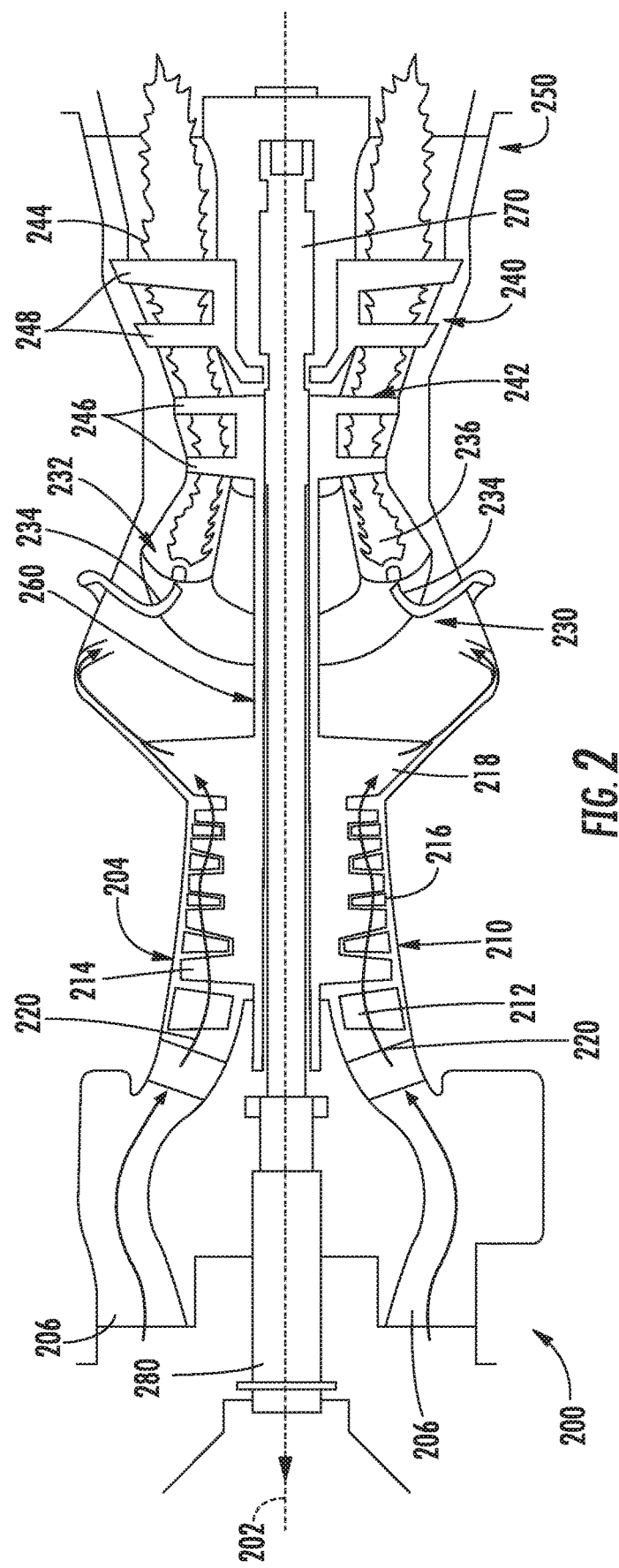
FIG. 2 is a schematic cross-sectional view of a gas turbine engine in accordance with one embodiment of the present disclosure.

FIG. 2 provides a schematic cross-sectional view of an example gas turbine engine 200 in accordance with the present disclosure. As shown in FIG. 2, the gas turbine engine 200 defines a longitudinal or centerline axis 202 extending therethrough for reference. The gas turbine engine 200 may generally include a substantially tubular outer casing 204 that defines an annular inlet 206. The outer casing 204 may be formed from a single casing or multiple casings. The outer casing 204 encloses, in serial flow relationship, a gas generator compressor 210, a combustion section 230, a turbine 240, and an exhaust section 250. The gas generator compressor 210 includes an annular array of inlet guide vanes 212, one or more sequential stages of compressor blades 214, one or more sequential stages of compressor vanes 216, and a centrifugal compressor 218. Collectively, the compressor blades 214, the compressor vanes 216, and the centrifugal compressor 218 define a compressed air path 220. The gas turbine engine 200 can include one or more sensors (not shown) for sensing information related to the gas turbine engine 200.

The combustion section 230 includes a combustion chamber 232 and one or more fuel nozzles 234 extending into the combustion chamber 232. The fuel nozzles 234 supply fuel to mix with compressed air entering the combustion chamber 232. Further, the mixture of fuel and compressed air combust within the combustion chamber 232 to form combustion gases 236. As will be described below in more detail, the combustion gas 236 drives the turbine 240.

The turbine 240 includes a gas generator turbine 242 and a power turbine 244. The gas generator turbine 242 includes one or more sequential stages of turbine rotor blades 246, and the power turbine 244 includes one or more sequential stages of turbine rotor blades 248. The gas generator turbine 242 drives the gas generator compressor 210 via a gas generator shaft 260, and the power turbine 244 drives an output shaft 280 via a power turbine shaft 270.

As shown in the embodiment illustrated in FIG. 2, the gas generator compressor 210 and the gas generator turbine 242 are coupled to one another via the gas generator shaft 260. In operation, the combustion gases 236 drives both the gas generator turbine 242 and the power turbine 244. As the gas generator turbine 242 rotates around the centerline axis 202, the gas generator compressor 210 and the gas generator shaft 260 both rotate around the centerline axis 202. Further, as the power turbine 244 rotates, the power turbine shaft 270 rotates and transfers rotational energy to the output shaft 280. As an example, the gas turbine engine 200 may be the first and second gas turbine engines 102 of FIG. 1.

Figure 3:
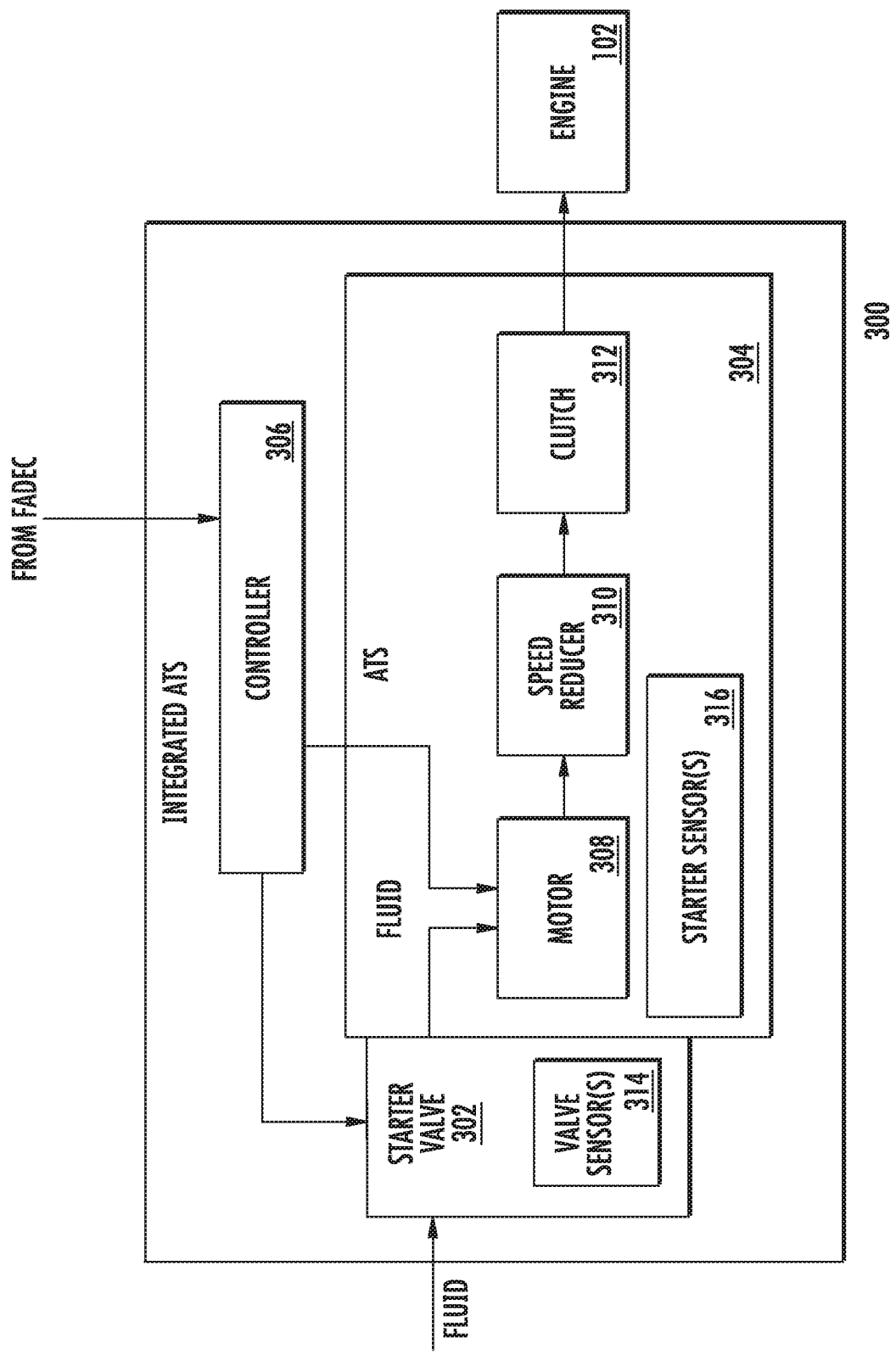
FIG. 3 depicts a block diagram of an integrated starter according to example embodiments of the present disclosure.

FIG. 3 depicts a block diagram of an integrated starter 300 according to example embodiments of the present disclosure. The integrated starter 300 can be in and/or coupled to the engine 102 of FIG. 1. The integrated starter 300 can include a starter air valve 302, an air turbine starter 304, and a controller 306. The starter air valve 302 can be integrated with the air turbine starter 304. For instance, the starter air valve 302 and the air turbine starter 304 can be located within a common housing. As another example, the starter air valve 302 can be mechanically coupled to the air turbine starter 304. The air turbine starter 304 can include an air turbine motor 308, a speed reducer 310, and an over-running clutch 312.

The starter air valve 302 can be in communication with the controller 306. The controller 306 can receive a signal from a full authority digital engine control (FADEC). The starter air valve 302 can regulate fluid flow to the air turbine motor 308 based on a signal received from the controller 306. The signal received from the controller 306 can be based on the signal received from the FADEC. The air turbine motor 308 can convert energy from the fluid supplied by the starter air valve 302 to high speed rotation energy. The speed reducer 310 can convert the high speed rotation energy (high speed, low torque) from the air turbine motor 308 into low speed, high torque used to rotate the over-running clutch 312. The rotating over-running clutch 312 can be used to engage with and start the engine 102.

The controller 306 can control the rate of opening of the starter air valve 302. For example, the controller 306 can cause the starter air valve 302 to open and shut at a rate of twice per second, or any other rate. The controller 306 can control the open percentage of the starter air valve 302. For example, the controller 306 can cause the starter air valve 302 can open to 53%, or any other value between 0% and 100%. The percentage open of the starter air valve 302 can be the position of the starter air valve 302. Changing the rate of opening and/or the open percentage of the starter air valve 302 can modify the fluid provided to the air turbine starter 304 from the starter air valve 302. The air turbine starter 304 can convert energy from the fluid provided to the air turbine starter 304 from the starter air valve 302 to a torque output usable for starting the engine 102.

Optionally, the starter air valve 302 can include one or more valve sensors 314. The one or more valve sensors 314 can include a pressure gauge, a vacuum gauge, a manometer, the like, and/or any combination of the foregoing. The one or more valve sensors 314 can measure pressure and/or temperature. The pressure and/or temperature can indicate a condition of the starter air valve 302. The starter air valve 302 can modify the rate of opening and/or the open percentage in response to the measured pressure and/or temperature. For example, if the measured pressure and/or temperature indicate that the energy should increase, then the starter air valve 302 can modify the rate of opening and/or the open percentage to increase the fluid provided to the air turbine starter 304. As a further example, if the measured pressure and/or temperature indicate that the energy should increase, then the starter air valve 302 can modify the open percentage of the starter air valve 302 from 75% to 80%. As another further example, if the measured pressure and/or temperature indicate that the energy should increase, then the starter air valve 302 can modify the rate of opening of the starter air valve 302 from 300 ms open per second to 750 ms open per second. The numerical examples provided herein are provided for purposes of illustration and discussion and are not intended to be limiting of the present disclosure.

Optionally, the air turbine starter 304 can include one or more starter sensors 316. For example, the one or more starter sensors 316 can be included on a stationary portion of the air turbine starter 304 to monitor a rotating portion of the air turbine starter 304. In another embodiment, the one or more starter sensors 316 can be included on the rotating portion of the air turbine starter 304 to monitor the rotating portion of the air turbine starter 304. The one or more starter sensors 316 can include an accelerometer, a microphone, the like, and/or any combination of the foregoing. The one or more starter sensors 316 can measure mechanical vibration and/or sound. The one or more starter sensors 316 can transmit the measured mechanical vibration and/or sound to a computing device, such as the computing device 600 of FIG. 6. The computing device 600 can be local to the integrated starter 300. The computing device 600 can be located in the engine 102. The one or more starter sensors 316 can transmit the measured mechanical vibration and/or sound to a controller. The controller can be local to the integrated starter 300. The controller can be located in the engine 102. The computing device 600 and/or the controller can determine an irregular movement of the rotating portion of the air turbine starter 304 based on the measured mechanical vibration and/or sound. The one or more starter sensors 316 can identify anomalies. The identified anomalies can originate from the integrated starter 300, engine 102, and/or accessory gearbox. The computing device 600 and/or the controller can create a notification to indicate a problem with the integrated starter 300, engine 102, and/or accessory gearbox in response to the determined irregular movement of the rotating portion of the air turbine starter 304.

Figure 4:
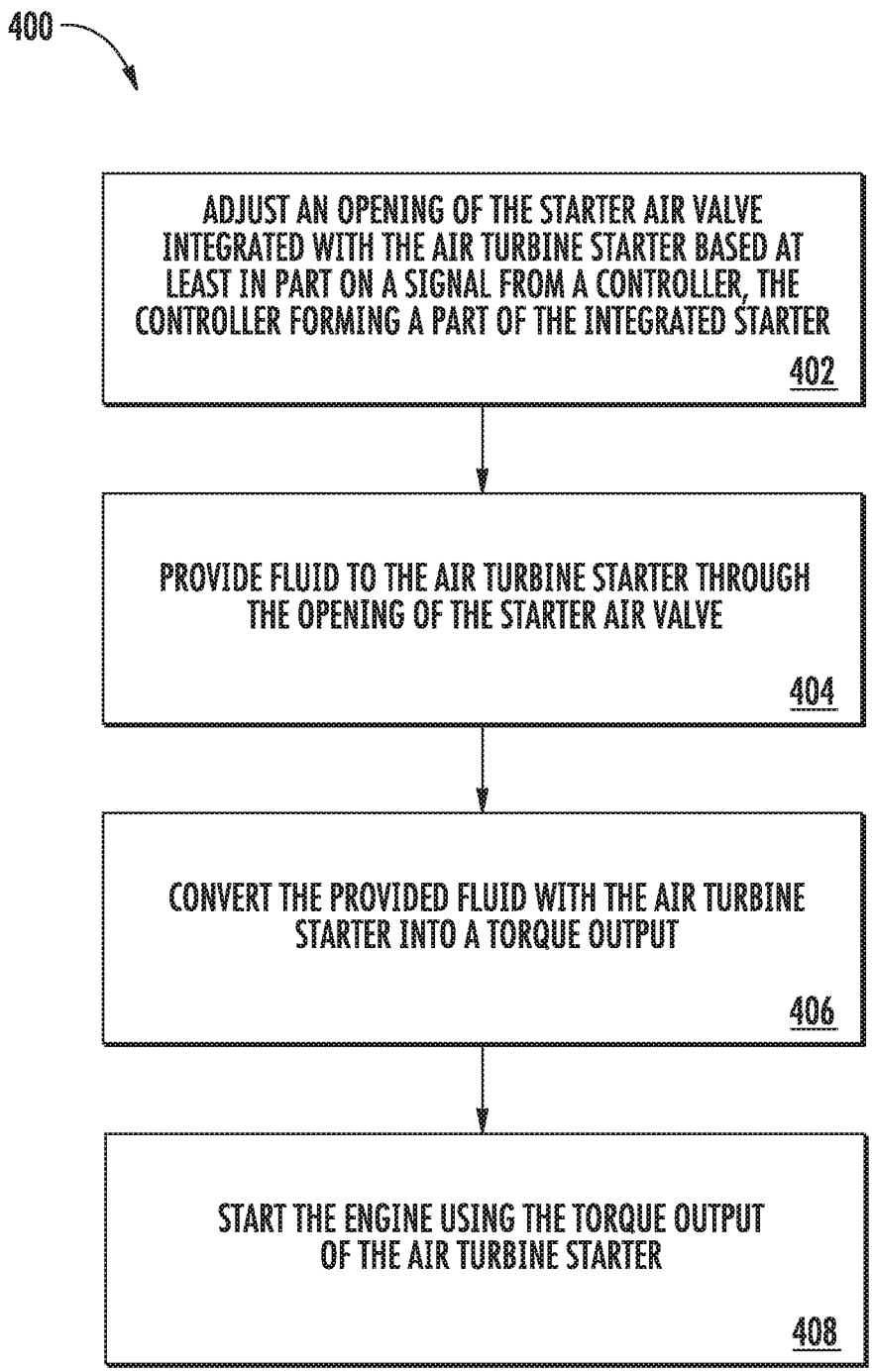
FIG. 4 depicts a flow diagram of an example method according to example embodiments of the present disclosure.

FIG. 4 depicts a flow diagram of an example method (400) for starting an engine using an integrated starter. The method of FIG. 4 can be implemented using, for instance, the integrated starter 300 of FIG. 3. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), an opening of a starter air valve integrated with the air turbine starter can be adjusted based at least in part on a signal from a controller. For instance, the integrated starter 300 can adjust an opening of a starter air valve 302 based on a control signal from controller 306.

At (404), fluid can be provided to an air turbine starter can be provided through the opening of the starter air valve. For instance, the integrated starter 300 can provide fluid to an air turbine starter 304 through the integrated starter air valve 312. In some embodiments, the fluid can be motive air, gases, other fluids, etc.

At (406), the provided fluid can be converted into a torque output. For instance, the integrated starter 300 can convert the provided fluid into a torque output. At (408), the engine can be started using the torque output. For instance, the integrated starter 300 can start the engine 102 using the torque output.

Optionally, a signal can be received at a controller or at the starter air valve from one or more valve sensors. The one or more valve sensors can include at least one of a pressure gauge, a vacuum gauge, and a manometer. At least one of the one or more valve sensors can measure pressure. At least one of the one or more valve sensors can measure temperature. The opening of the starter air valve can be adjusted based on the signals from the one or more valve sensors. For example, the integrated starter 300 can adjust the opening of the starter air valve 302 based on the signals from the one or more valve sensors 314.

Figure 5:
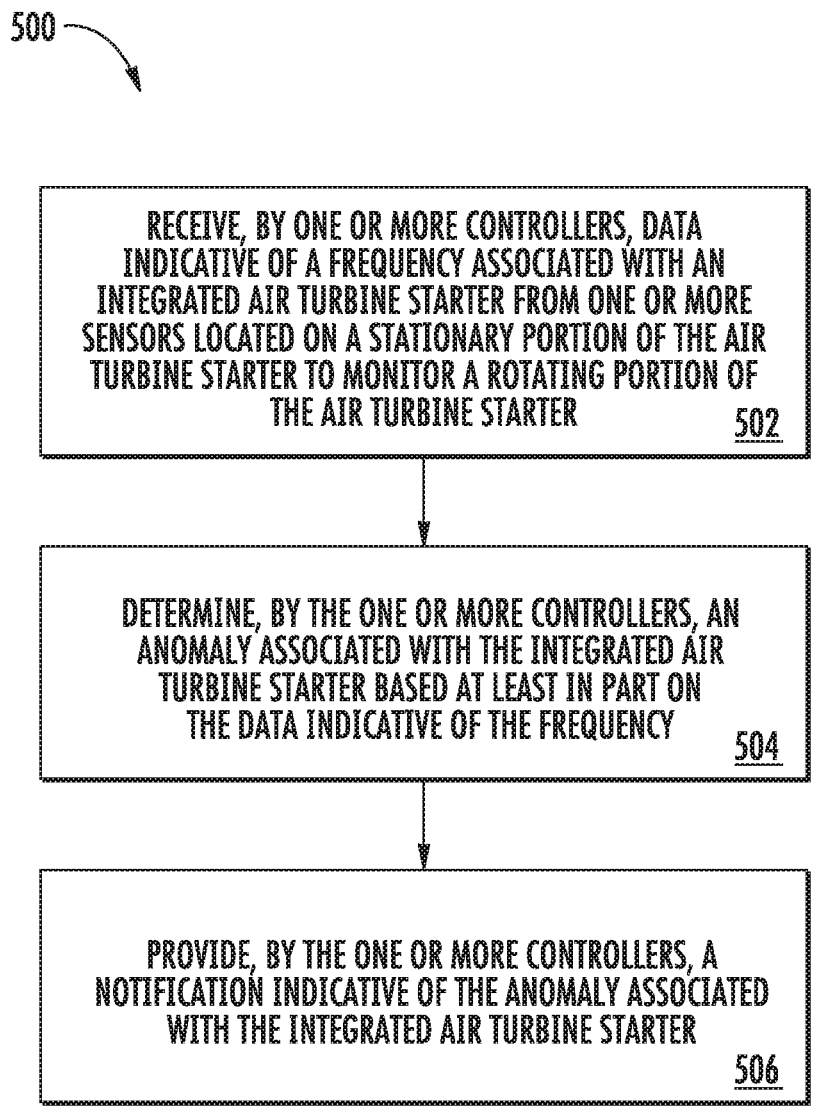
FIG. 5 depicts a flow diagram of an example method according to example embodiments of the present disclosure.

FIG. 5 depicts a flow diagram of an example method (500) for detecting an anomaly with an air turbine starter. The method of FIG. 5 can be implemented using, for instance, one or more control systems 600 of FIG. 6 and/or the controller 306 of FIG. 3. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (502), data indicative of a frequency and/or magnitude associated with an integrated air turbine starter can be received from one or more sensors located on a stationary portion of the air turbine starter to monitor a rotating portion of the air turbine starter. For instance, the one or more control systems 600 can receive data indicative of a frequency and/or magnitude associated with an integrated air turbine starter can be received from one or more sensors 316 located on a stationary portion of the air turbine starter to monitor a rotating portion of the air turbine starter 304. In another example, the controller 306 can receive data indicative of a frequency and/or magnitude associated with an integrated air turbine starter can be received from one or more sensors 316 located on a stationary portion of the air turbine starter to monitor a rotating portion of the air turbine starter 304. In some embodiments, the frequency can be a mechanical frequency. In some embodiments, the frequency can be an audio frequency. The one or more sensors can include, for instance, an accelerometer or a microphone. The controller 306 can be remote from the integrated aircraft turbine starter. The controller 306 can be located in the integrated aircraft turbine starter.

At (504), an anomaly associated with the integrated air turbine starter can be determined based at least in part on the data indicative of the frequency and/or magnitude. For instance, the one or more control systems 600 can determine an anomaly associated with the integrated air turbine starter 304 based at least in part on the data indicative of the frequency and/or magnitude. In another example, the controller 306 can determine an anomaly associated with the integrated air turbine starter 304 based at least in part on the data indicative of the frequency and/or magnitude. The anomaly associated with the integrated air turbine starter can indicate an anomaly with the engine. The anomaly associated with the integrated air turbine starter can indicate an anomaly with the accessory gearbox.

At (506), a notification indicative of the anomaly associated with the integrated air turbine starter can be provided. The notification can include a visual, optical or other communicated notification. For instance, the notification can be communicated to a user interface (e.g., speaker, display, etc.) for alerting a user or technician of the anomaly.

Figure 6:
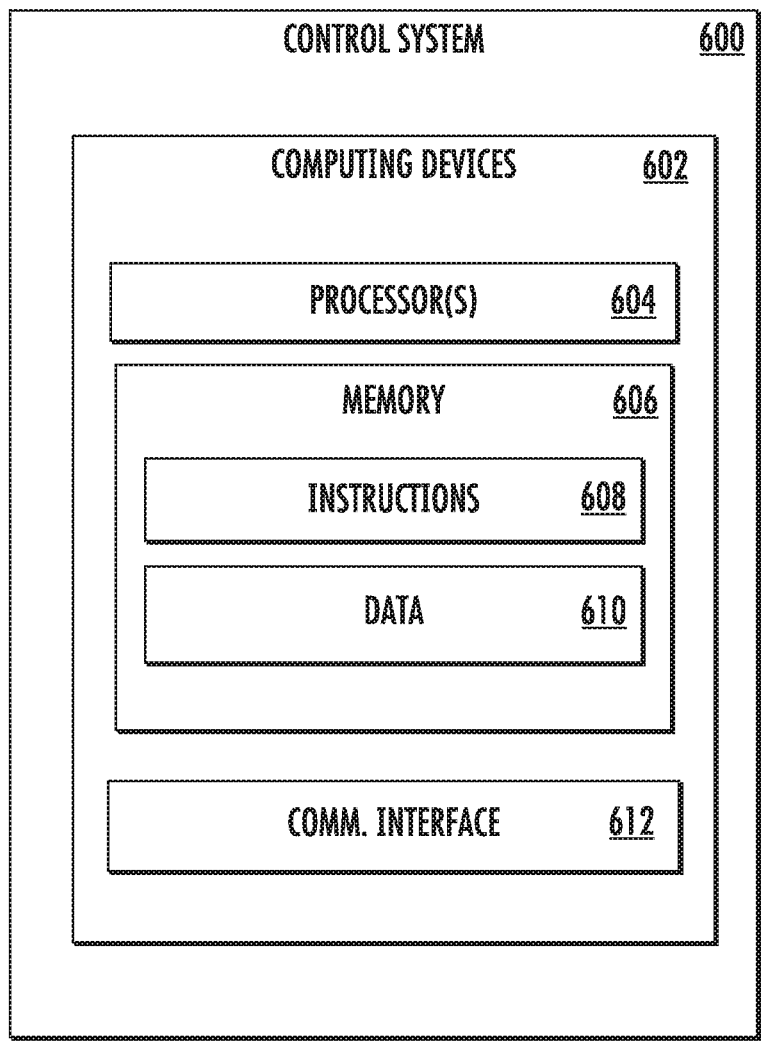
FIG. 6 depicts a computing system for implementing one or more aspects according to example embodiments of the present disclosure.

FIG. 6 depicts a block diagram of an example computing system that can be used to implement the control system 600 or other systems of the aircraft according to example embodiments of the present disclosure. As shown, the control system 600 can include one or more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable media, RAM, ROM, hard drives, flash drives, or other memory devices.

The one or more memory device(s) 606 can store information accessible by the one or more processor(s) 604, including computer-readable instructions 608 that can be executed by the one or more processor(s) 604. The instructions 608 can be any set of instructions that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations, such as the operations for integrating an air turbine starter and starter air valve, as described with reference to FIG. 4, the operations for sensing problems with the integrated starter, as described with reference to FIG. 5, and/or any other operations or functions of the one or more computing device(s) 602.

The memory device(s) 606 can further store data 610 that can be accessed by the processors 604. For example, the data 610 can include data sensed by the one or more valve sensors 314, data sensed by the one or more starter sensors 316, and/or any other data associated with aerial vehicle 100, as described herein. The data 610 can include one or more table(s), function(s), algorithm(s), model(s), equation(s), etc. for starting an engine 102 according to example embodiments of the present disclosure.

The one or more computing device(s) 602 can also include a communication interface 612 used to communicate, for example, with the other components of system. The communication interface 612 can include any suitable components for interfacing with one or more network(s), including for example, transmitters, receivers, ports, controllers, antennas, or other suitable components.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An integrated starter for starting an engine on an aircraft comprising:
    an air turbine starter comprising one or more starter sensors configured to determine a vibration and/or sound of a rotating portion of the air turbine starter;
    a starter air valve integrated with the air turbine starter; and
    a controller configured to control the starter air valve based at least in part on a notification from the one or more starter sensors indicative of such a vibration and/or sound,
    wherein the starter air valve is movable between a first position and at least a second position to regulate the flow of fluid into the air turbine starter;
    wherein an output torque of the air turbine starter is dependent at least in part on the flow of fluid into the air turbine starter.

2. The integrated starter of claim 1, wherein the starter air valve comprises one or more valve sensors.

3. The integrated starter of claim 2, where the one or more valve sensors comprise at least one of a pressure gauge, a vacuum gauge, and a manometer.

4. The integrated starter of claim 2, wherein at least one of the one or more valve sensors is configured to measure a pressure.

5. The integrated starter of claim 2, wherein at least one of the one or more valve sensors is configured to measure a temperature.

6. The integrated starter of claim 2, wherein the starter air valve is further configured to adjust the opening of the starter air valve from a first open percentage to a second open percentage based on signals from the one or more valve sensors.

7. The integrated starter of claim 6, wherein the air turbine starter comprises an air turbine motor.

8. The integrated starter of claim 6, wherein the air turbine starter comprises a speed reducer.

9. The integrated starter of claim 1, wherein the air turbine starter comprises an over-running clutch.

10. A method for starting an engine using an integrated starter, the method comprising:
adjusting an opening of a starter air valve integrated with an air turbine starter based at least in part on a signal from a controller, the air turbine starter comprising one or more starter sensors configured to determine a vibration and/or sound associated with a rotating portion of the air turbine starter, and the opening being adjusted based at least in part on a notification from the one or more starter sensors indicative of such a vibration and/or sound, the controller forming a part of the integrated starter;
providing fluid to the air turbine starter through the opening of the starter air valve;
converting the provided fluid with the air turbine starter into a torque output; and
starting the engine using the torque output of the air turbine starter.

11. The method of claim 10, further comprising:
receiving a signal from one or more valve sensors.

12. The method of claim 11, where the one or more valve sensors comprise at least one of a pressure gauge, a vacuum gauge, and a manometer.

13. The method of claim 11, wherein at least one of the one or more valve sensors measures pressure.

14. The method of claim 11, wherein at least one of the one or more valve sensors measures temperature.

15. The method of claim 11, further comprising:
adjusting the opening of the starter air valve based on the signals from the one or more valve sensors.

16. The method of claim 15, wherein the air turbine starter comprises an air turbine motor.

17. The method of claim 15, wherein the air turbine starter comprises a speed reducer.

18. An aerial vehicle comprising:
an engine; and
an integrated air turbine starter configured to start the engine; the integrated air turbine starter comprising:
an air turbine starter comprising one or more starter sensors configured to determine a vibration and/or sound of a rotating portion of the air turbine starter;
a starter air valve integrated with the air turbine starter; and
a controller configured to control the starter air valve based at least in part on a notification from the one or more starter sensors indicative of such a vibration and/or sound,
wherein the starter air valve is movable between a first position and at least a second position to regulate the flow of fluid into the air turbine starter;
wherein an output torque of the air turbine starter is dependent at least in part on the flow of fluid into the air turbine starter.

19. The aerial vehicle of claim 18, wherein the starter air valve comprises one or more valve sensors.

20. The aerial vehicle of claim 19, wherein the starter air valve is further configured to adjust the opening of the starter air valve from a first open percentage to a second open percentage based on signals from the one or more valve sensors.

* * * * *